US008868483B2

(12) United States Patent
Golani et al.

(10) Patent No.: US 8,868,483 B2
(45) Date of Patent: Oct. 21, 2014

(54) DATABASE LOAD ENGINE

(75) Inventors: Sushil Golani, Charlotte, NC (US);
Kent Steger, Huntersville, NC (US);
Raja Gottumukkala, Charlotte, NC (US); Satish Dandamudi, Concord, NC (US); Sangeetha Mohan, Charlotte, NC (US); Johnson Athial, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 614 days.

(21) Appl. No.: 12/605,957

(22) Filed: Oct. 26, 2009

(65) Prior Publication Data

US 2011/0099170 A1    Apr. 28, 2011

(51) Int. Cl.
*G06F 17/30* (2006.01)
(52) U.S. Cl.
CPC ............... *G06F 17/30563* (2013.01)
USPC ............ 707/602; 707/687; 707/737; 707/756
(58) Field of Classification Search
CPC ............................................. G06F 17/30563
USPC .................. 707/602, 687, 737, 756
See application file for complete search history.

(56) References Cited

U.S. PATENT DOCUMENTS

| 2002/0072927 | A1* | 6/2002 | Phelan et al. ................ 705/1 |
| 2003/0115207 | A1 | 6/2003 | Bowman et al. |
| 2005/0033694 | A1* | 2/2005 | Perrin ............................. 705/44 |
| 2005/0125086 | A1 | 6/2005 | Noda et al. |
| 2005/0204034 | A1* | 9/2005 | Betarbet ....................... 709/224 |
| 2006/0031187 | A1* | 2/2006 | Pyrce et al. ....................... 707/1 |
| 2008/0243715 | A1* | 10/2008 | Stellhorn et al. ............ 705/36 R |
| 2008/0270398 | A1* | 10/2008 | Landau et al. .................... 707/6 |
| 2010/0030793 | A1* | 2/2010 | Cooper et al. ................ 707/100 |

OTHER PUBLICATIONS

"Pathway to master data management: Master data integration from IBM", copyright Dec. 2006.*
Taylor et al. "Data integration and composite business services, Part I: Provide a single view of a customer", Jun. 28, 2007.*
Office Action from U.S. Appl. No. 12/717,752, mailed Dec. 7, 2011.
Office Action from U.S. Appl. No. 12/717,752, mailed Apr. 24, 2012.

* cited by examiner

*Primary Examiner* — Apu Mofiz
*Assistant Examiner* — Cindy Nguyen
(74) *Attorney, Agent, or Firm* — Banner & Witcoff, Ltd.; Michael A. Springs

(57) ABSTRACT

The invention described herein provides a load engine and method for efficiently accomplishing mass conversions of customer data into an existing customer database. In particular, the method incorporates existing business rules for validating new customer data and for creating tables for the new customer data, creates load files for the new customer data, and provides a means for running multi-threaded data loads of the new customer data tables onto an existing customer database.

17 Claims, 14 Drawing Sheets

| Table Name | Table Key |
|---|---|
| CONTACT | CONT_ID |
| CONTEQUIV | CONT_EQUIV_ID |
| PERSON | -NA- |
| PERSONNAME | PERSON_NAME_ID |
| ORG | -NA- |
| ORGNAME | ORG_NAME_ID |
| LOCATIONGROUP | LOCATION_GROUP_ID |
| ADDRESSGROUP | -NA- |
| ADDRESS | ADDRESS_ID |
| CONTACTMETHODGROUP | -NA- |
| CONTACTMETHOD | CONTACT_METHOD_ID |
| IDENTIFIER | IDENTIFIER_ID |
| LOBREL | LOB_REL_ID |
| MISCVALUE | MISCVALUE_ID |
| CONTRACT | CONTRACT_ID |
| CONTRACTCOMPONENT | CONTR_COMPONENT_ID |
| CONTRACTROLE | CONTRACT_ROLE_ID |
| XSEARCHNAME | -NA- |
| XACCOUNT | -NA- |
| INCOMESOURCE | INCOME_SOURCE_ID |
| XAMLOWNER | AMLOWNER_ID |

FIG. 4A

DATABASE LOAD ENGINE

FIELD OF THE INVENTION

This invention relates to methods for efficiently loading a large volume of customer data directly to an operational customer database. In particular, the invention provides a load engine for processing customer data and loading the customer data to a target database.

BACKGROUND

It is not uncommon for large corporations or other large entities to serve hundreds of thousands of customers, and even customers in excess of 1,000,000. Given the large scale, it is increasingly common, and in most cases essential, for such entities to use robust and complex enterprise systems or databases to manage customer or member data. In addition to simply storing data, entities also need the ability to manipulate the customer data, authenticate the customer data, add to the customer data, or delete the customer data from a system or database holding the customer data.

While companies may have specialized database systems for storing and querying on specific types of data, such as customer data, there is often a need to add large quantities of data to the existing databases. For example, it is common for entities to merge, or for one entity to acquire another entity. In such a case, customer data from one of the entities may need to be combined with existing customer data from an acquiring entity.

Typically, to add quantities of data to a database, it is necessary to invoke processes on current database servers to add the data. Such server processes can be slow and can require extensive runtime processing by the server, and as a result can have a negative impact on the server's ability to handle normal database services such as database queries or other updates. In addition, merging data from disparate database systems often requires that data be transformed to a format consistent with a target database, requiring additional server runtime. Thus, there is a need for an efficient method of processing and loading large quantities of customer data to an existing database, wherein the method does not interfere with the normal operations of a database. In addition, there is a need for an efficient method of replicating such data on backup or replicated data stores.

SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

Aspects of the disclosure provide a simplified load engine and method for efficiently accomplishing mass conversions of customer data into an existing customer database without incurring an outage of the operational database and while continuing to service full volume production traffic on the database. According to one embodiment disclosed herein, the load engine may receive new customer data consisting of either personal customer attributes or business customer attributes or both. The load engine may validate the data according to established business rules, and may transform the data to comport with the data model for the existing or target database. Validations may include verifying that essential customer data fields exist and are in the right format, or that customer identification keys exist. If the load engine determines that certain customer files do not meet certain mandatory criteria, the data files may be rejected for further processing.

After validating and transforming the customer data, the load engine may place the data in tables corresponding to specific customer attributes, such as "NAME," "CONTACT-METHOD," or "ADDRESS." The load engine may further generate keys for the tables, prepare load files based on the tables, and partition the tables for multithreaded loading into the target database.

According to examples of the disclosure provided herein, customer data on the order of millions of records (e.g., 9+ million records) may be processed in a condensed period of time, while effected databases stay fully operational. For example, aspects of the disclosure may allow for loading at an exemplary rate of 200 transactions/second, and in a total elapsed time of approximately 24 hours.

BRIEF DESCRIPTION OF THE DRAWINGS

The present disclosure is illustrated by way of example in the following figures and is not limited by the accompanying figures in which:

FIG. 4A depicts table names and exemplary table key generation according to an embodiment of the present disclosure.

DETAILED DESCRIPTION

Aspects of the present disclosure provide a load engine for loading customer data to an existing customer database. According to an embodiment described herein, a load engine may perform a multi-step approach to load customer data directly to an existing database on a table-wise basis.

Figure 1:
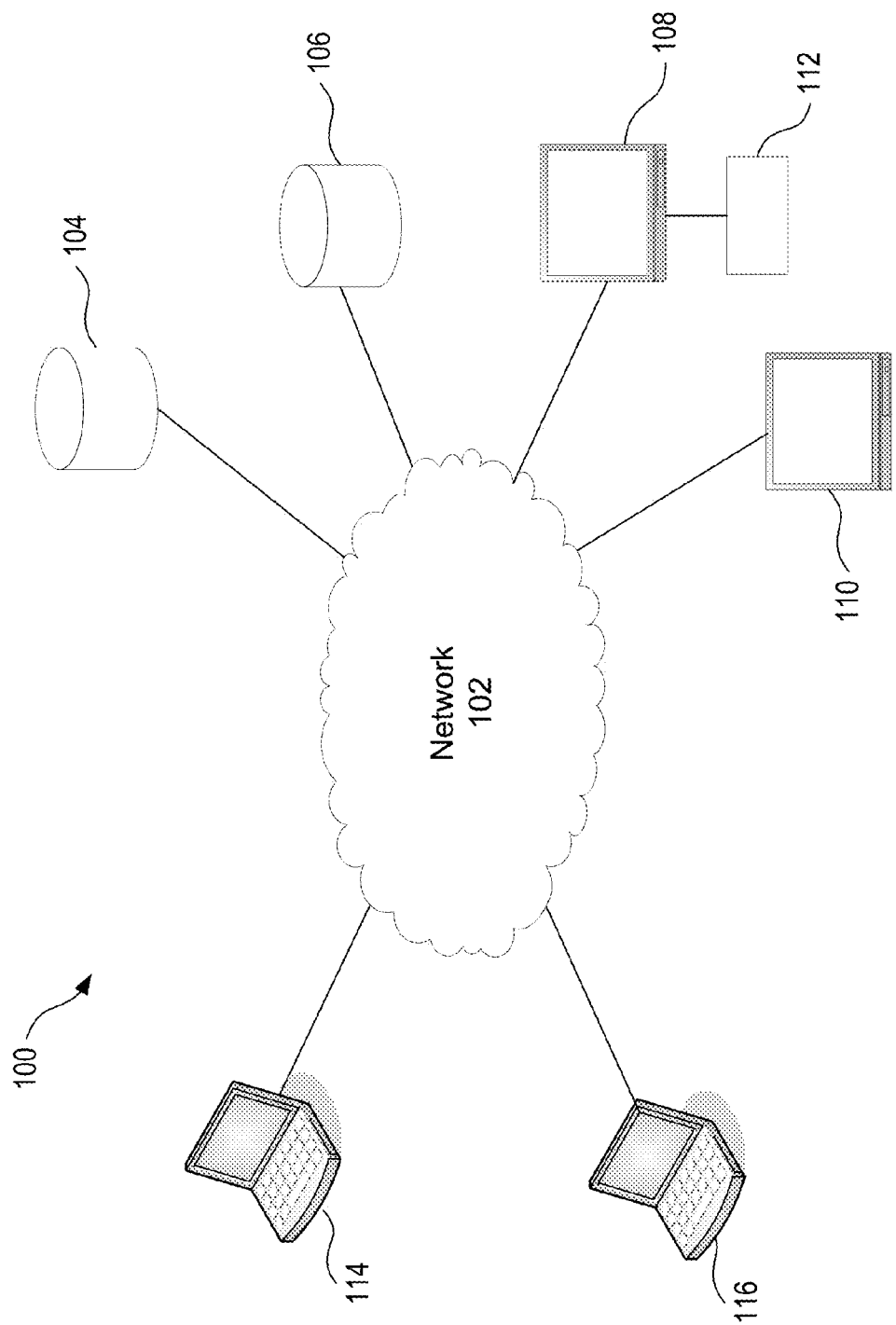
FIG. 1 depicts an illustrative operating environment in which various aspects of the disclosure may be implemented.

FIG. 1 depicts an illustrative operating environment 100, suitable for use in implementing embodiments of the disclosure provided herein. According to FIG. 1, various computing components, including data centers 104 and 106, load engine 108, server 110, storage device 112, and workstations 114 and 116, may be connected to, and communicate via network 102.

Network 102 may be a public network such as the public Internet, or may be a private network such as an Intranet. Network 102 may also be a combination of networks, wired or wireless, over which the components 104, 106, 108, 110, 112, 114, 116 may communicate with each other and with other components not depicted in FIG. 1. As such, operating environment 100 should only be considered exemplary and in no way limiting to aspects of the disclosure described herein.

According to FIG. 1, operating environment 100 may comprise data centers 104 and 106 for housing customer data or other types of data. Data centers 104 and 106 may be databases or other suitable data warehouses for storing data. In addition, data centers 104 and 106 may contain the same data, and therefore comprise replicated systems, or may be distinct databases containing distinct sets of data. Operating environment may also comprise a number of network service devices, such as load engine 108 and server 110. Load engine 108 may comprise a project-specific device, such as the load engine contemplated herein for performing aspects of the load engine process. Server 110 may be any suitable type of network server for managing resources depicted in FIG. 1 or for communicating with and managing other computing components (not depicted). For example, server 110 may be a database server configured to process inquiries to, or run processes for, data centers 104 and/or 106. Exemplary devices 108 and 110 may be based on any suitable operating system known to those skilled in the art. In addition, according to aspects of the disclosure, devices 108 and 110 may be connected to other storage devices, such as storage device 112. According to at least one embodiment of the disclosure described herein, storage device 112 may be a separate customer information system (CIS) configured to house customer data and to transmit customer data to server 108 for processing.

Operating environment 100 may also comprise a plurality of workstations, such as workstations 114 and 116, configured to utilize resources connected to network 102. For example, workstations 114 and 116 may be located at a place of business or at a home, and may be configured to query data centers 104 and 106 to get customer data or other data stored therein. As such, while workstations 114 and 116 may be computer workstations, those skilled in the art will recognize that many computing devices may be used to initiate queries, such as other servers, mobile devices, laptop computers or the like.

Figure 2:
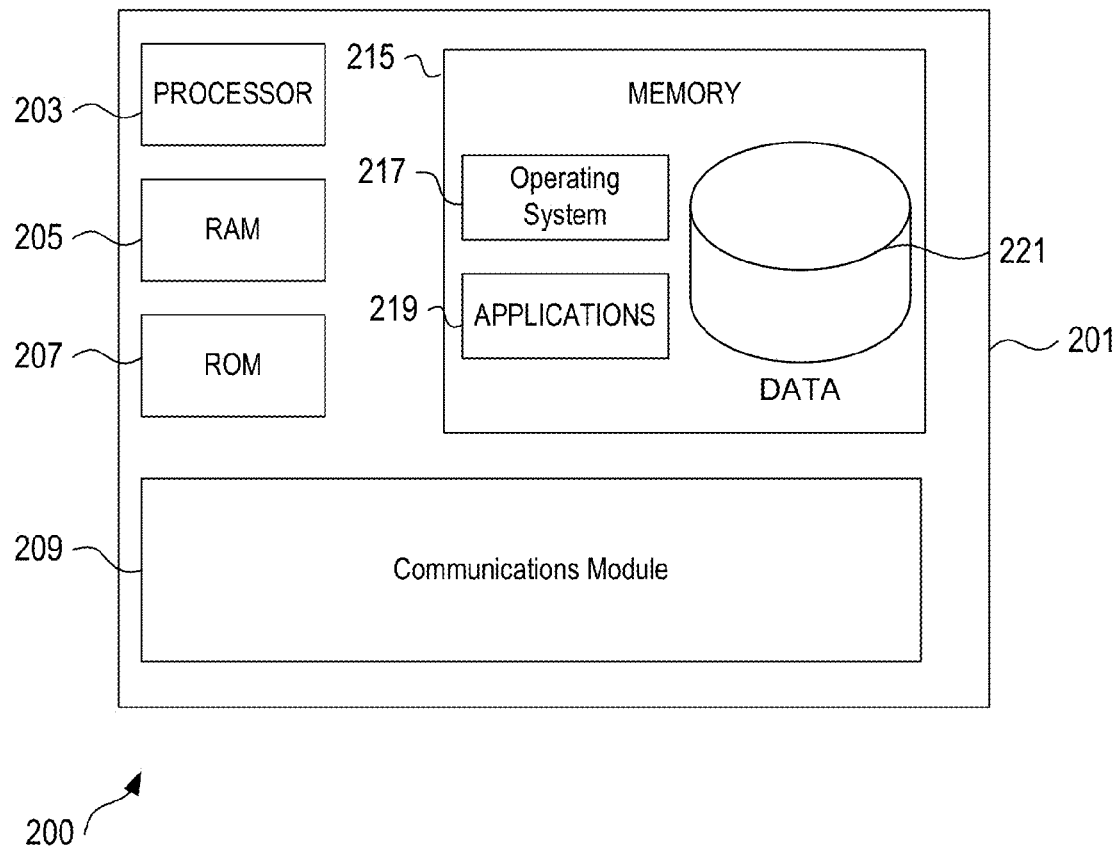
FIG. 2 depicts an illustrative computing system, suitable for use in implementing embodiments of the disclosure described herein.

FIG. 2 depicts an illustrative computing system 200, suitable for use in implementing embodiments of the disclosure described herein. For example, any of components 104, 106, 108, 110, 112, 114, 116 depicted in FIG. 1 may be implemented by an exemplary computing system 200 such as that depicted in FIG. 2. Computing system 200 is only one example of a suitable computing environment and is not intended to suggest any limitation as to the scope of use or functionality of the invention. The illustrative operating environment of FIG. 1 should not be interpreted as having any dependency or requirement relating to any one or combination of components shown in the illustrative computing system 200.

The invention is also operational with numerous other general purpose or special purpose computing system environments or configurations. Examples of well known computing systems, environments, and/or configurations that may be suitable for use with the invention include, but are not limited to, personal computers, servers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 2, the computing system environment 200 may include a computing device 201 wherein the processes discussed herein may be implemented. The computing device 201 may have a processor 203 for controlling overall operation of the computing device 201 and its associated components, including RAM 205, ROM 207, communications module 209, and memory 215. Computing device 201 typically includes a variety of computer readable media. Computer readable media may be any available media that may be accessed by computing device 201 and include both volatile and nonvolatile media, removable and non-removable media. By way of example, and not limitation, computer readable media may comprise any combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 201.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 205 may include one or more applications representing the application data stored in RAM memory 205 while the computing device is on and corresponding software applications (e.g., software tasks) are running on the computing device 201.

Communications module 209 may include a microphone, keypad, touch screen, and/or stylus through which a user of computing device 201 may provide input, and may also include one or more of a speaker for providing audio output and a video display device for providing textual, audiovisual and/or graphical output.

Software may be stored within memory 215 and/or storage to provide instructions to processor 203 for enabling computing device 201 to perform various functions. For example, memory 215 may store software used by the computing device 201, such as an operating system 217, application programs 219, and an associated database 221. Alternatively, some or all of the computer executable instructions for computing device 201 may be embodied in hardware or firmware (not shown). Database 221 may provide centralized storage of pre-clearance information or trading information for security equities in different jurisdictions.

Computing device 201 may operate in a networked environment supporting connections to one or more remote computing devices, such as branch terminals 241 and 251. The branch computing devices 241 and 251 may be personal computing devices or servers that include many or all of the elements described above relative to the computing device 201.

Communications module 209 may support a local area network (LAN) connection and a wide area network (WAN) connection, such as the public Internet, as well as other network connections familiar to those skilled in the art. When used in a LAN networking environment, computing device 201 is connected to the LAN through a network interface or adapter in the communications module 209. When used in a WAN networking environment, computing device 201 may include a modem in the communications module 209 or other means for establishing communications over the WAN. It will be appreciated that the network connections shown are illustrative and other means of establishing a communications link between the computing devices may be used. In addition, the existence of any of various well-known protocols such as TCP/IP, Ethernet, FTP, HTTP and the like is presumed herein Embodiments of the disclosure may include forms of computer-readable media. Computer-readable media include any available media that can be accessed by a computing device 201. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. For example, aspects of the method steps disclosed herein may be executed on a processor on a computing device 201. Such a processor may execute computer-executable instructions stored on a computer-readable medium.

Figure 3:
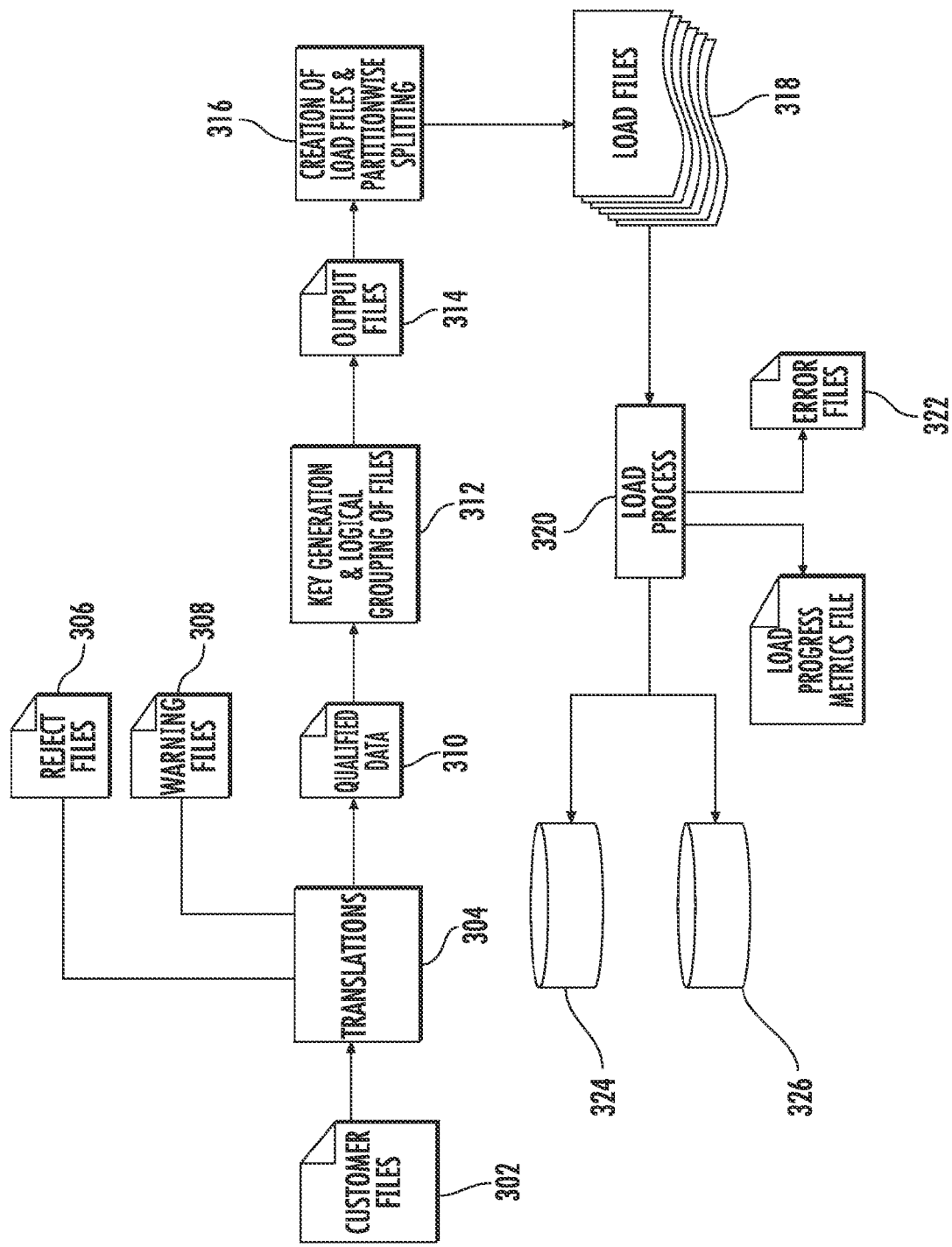
FIG. 3 depicts a high level flowchart of aspects of the disclosure, according to at least one embodiment of the present disclosure.

FIG. 3 depicts a high-level overview of the load engine process described herein, according to an embodiment of the disclosure. In FIG. 3, customer files 302 represent new customer data to be processed for loading to exemplary data centers 324 and 326. Customer files 302 may be received from an external customer information system (CIS). According to examples described herein, a CIS may be a server or other computer storage device providing centralized storage of customer related data. A CIS may also provide enterprise services for inquiry and maintenance of customer information from various customer- and associate-facing channels such as online customer services, telephonic services, to call center employees, to business center employees and the like.

At 304, the customer files undergo translations and validations. This may include validations such as verifying that essential table fields exist and are in a format that is compatible with a data model of the target database, or that customer identification keys exist. Customer files that do not meet certain mandatory criteria may be moved to rejected status at 306. Customer files that do not meet certain criteria, but which may be rectified may be moved to warning status for further processing at 308. After the validations stage at 304, the files that meet certain predefined terms become qualified files at 310, and are ready for further processing by the load engine process.

At 312, the load engine may generate keys for certain sets of data. The load engine may also group files logically, based on the underlying code being used to create grouped output files 314. At 316, load files 318 are created and partitioned for loading. Table records may be partitioned for loading such that the load process 320 may operate in multiple threads for efficiency. Finally, load process 320 loads the customer data, on a table-wise basis, to existing data centers 324 and 326. Error files 322 that are not loaded properly may be discarded or reviewed for further processing. Details and flows of specific aspects of the load process disclosed herein will be described further below with respect to FIGS. 4-8.

Figure 4:
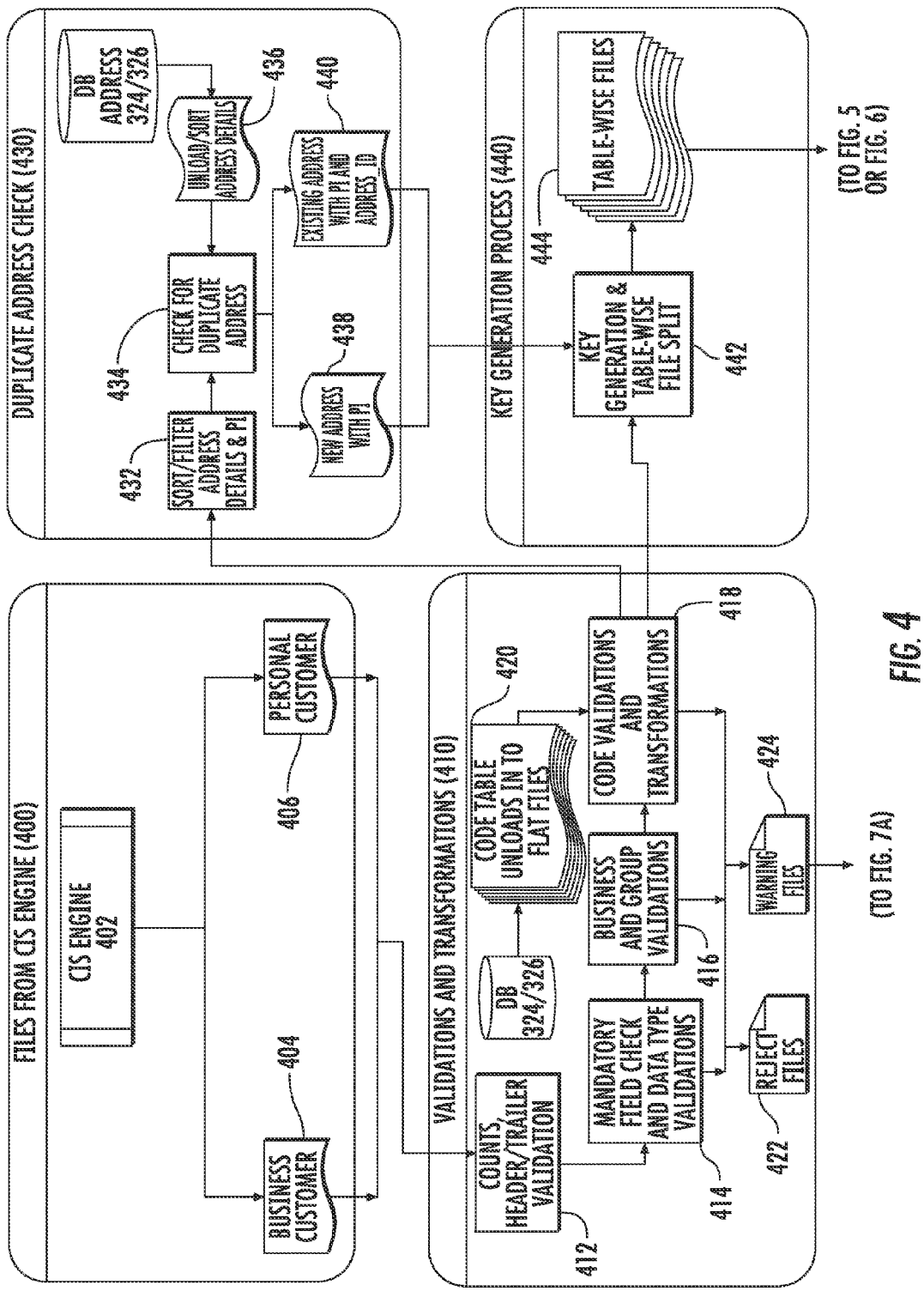
FIG. 4 depicts a flowchart describing certain validation, transformation and key generation steps of a load process, according to at least one embodiment of the present disclosure.

FIG. 4 describes the flow of the load process during the validation, transformation, and key generation for customer data, according to at least some embodiments described herein. Specifically, FIG. 4 depicts the flow of the load engine process from receiving customer information files from CIS (depicted at 400), to validation and transformation of the customer data (depicted at 410), to the generation of keys for the tables (depicted at 430). Also depicted in FIG. 4 is the process of reviewing the customer data for duplicate addresses (depicted at 420).

As depicted at 400, CIS Engine 402 may receive customer data files from an old customer data system or from a separate entity to be merged to an existing customer database. CIS Engine may split the data into two separate sets of data, business system customer data 404 and personal customer data 406. The two sets of data 404 and 406 may then be processed separately by the load engine process.

As depicted at 410, the load engine process may begin validating and translating the data, as necessary, upon receipt of customer data files from CIS. At 412, the input data record counts and header and trailer time stamps may be validated. At 414, the load engine may perform a quality check to ensure that mandatory fields (e.g., "NAME" or "ORGANIZATION NAME") exist and contain appropriate data. Further, the load engine may validate data or attribute types to ensure consistency with the data model for a target or existing database. Absent consistency, the load engine may perform data type transformations at 418. At 416, the load engine may incorporate existing business rules and or group rules.

Further according to aspects of the disclosure, portions of customer data may be stored separately if the data is referenced by a code(s) value for the customer data. For example, a "COUNTRY" entry, "USA" may be stored by reference to a particular code, as opposed to being stored by the data "USA." Such codes may be stored in separate tables and at 420, the code values may be unloaded for incorporation with the new customer data files and customer identifiers. Thus, for customer attributes having predefined code values, only the code value is stored by the load process in an associated attribute table. Thus, following the country code example above, the code tables are unloaded at 420 from the existing database, so that the load engine will know to store the requisite code value for the country USA instead of the data "USA" when completing transformations and building the tables for the data at step 418.

At 418, the load engine may perform any code validations and data transformations determined necessary by steps 412, 414 or 416, and to place the data in acceptable format according to the data model of the existing or target database. This may include incorporating code values, and defining any default code values where necessary. Any customer data records failing the validations and transformation rules of 410 may be written to reject files 422 or warning files 424. Subsequent processing of warning files 424 is discussed below in relation to FIG. 7A.

According to at least one embodiment described herein, and referring to process 430 of FIG. 4, the load engine process may also screen the customer data to determine if a duplicate address exists in the existing or target database. Thus, the load engine may sort and/or filter the new customer address details, including a unique party ID that may be associated with each customer record, at 432 and unload existing customer address details from an existing or target database, such as database 324 or 326 (reference numbers carried over from FIG. 3), at 436. The load engine may then compare the new address details with the existing address details at 434. For non-duplicate address details, the load engine may create a file of new address records at 438. For duplicate address details, at 440 the load engine may create a file with existing address details and associate an existing address table key with the file (table keys are described further below).

Table structures for loading to the target database may be defined by the load engine process such that for the each customer record, data comprising customer attributes may be stored in separate tables, i.e. the data may be distributed or highly normalized. FIG. 4A is a graph 450 depicting exemplary table names 452 with exemplary table keys 454 (as discussed more below). For example, as depicted in FIG. 4A, for each customer record, there may be an entry in a "CONTACT" table 456, an entry in "PERSONNAME" table 458 or "ORGNAME" table 460 for the customer or business name, respectively, an entry in the "ADDRESS" table 462 for the customer's address, and the like. According to aspects of the disclosure, the "CONTACT" table 456 may be the parent table, and may specify whether the entry is a person or a business, and may associate a key with a specific customer which may be used to link the records of each attribute table together.

Referring back to FIG. 4, at 440, the load engine may begin key generation for the data tables. According to aspects described herein, the load engine may generate a unique key for each table (454 of FIG. 4A). The key may then be stored across the tables to associate customer records and facilitate searching within a database. Again, FIG. 4A depicts exemplary keys for customer data tables in column 454. Thus, during the validation and transformation procedures of 410, customer data may be validated, and transformed, if necessary, and during the key generation procedures of 440, the customer data may be split table-wise and associated with table keys. Once the data is split table-wise and associated with specific keys, at 444, the load engine may prepare the table-wise files of the customer data for loading into the target or existing database. In generating table keys, the load engine may use existing key generation programs provided by a data model of the existing or target database.

Figure 5:
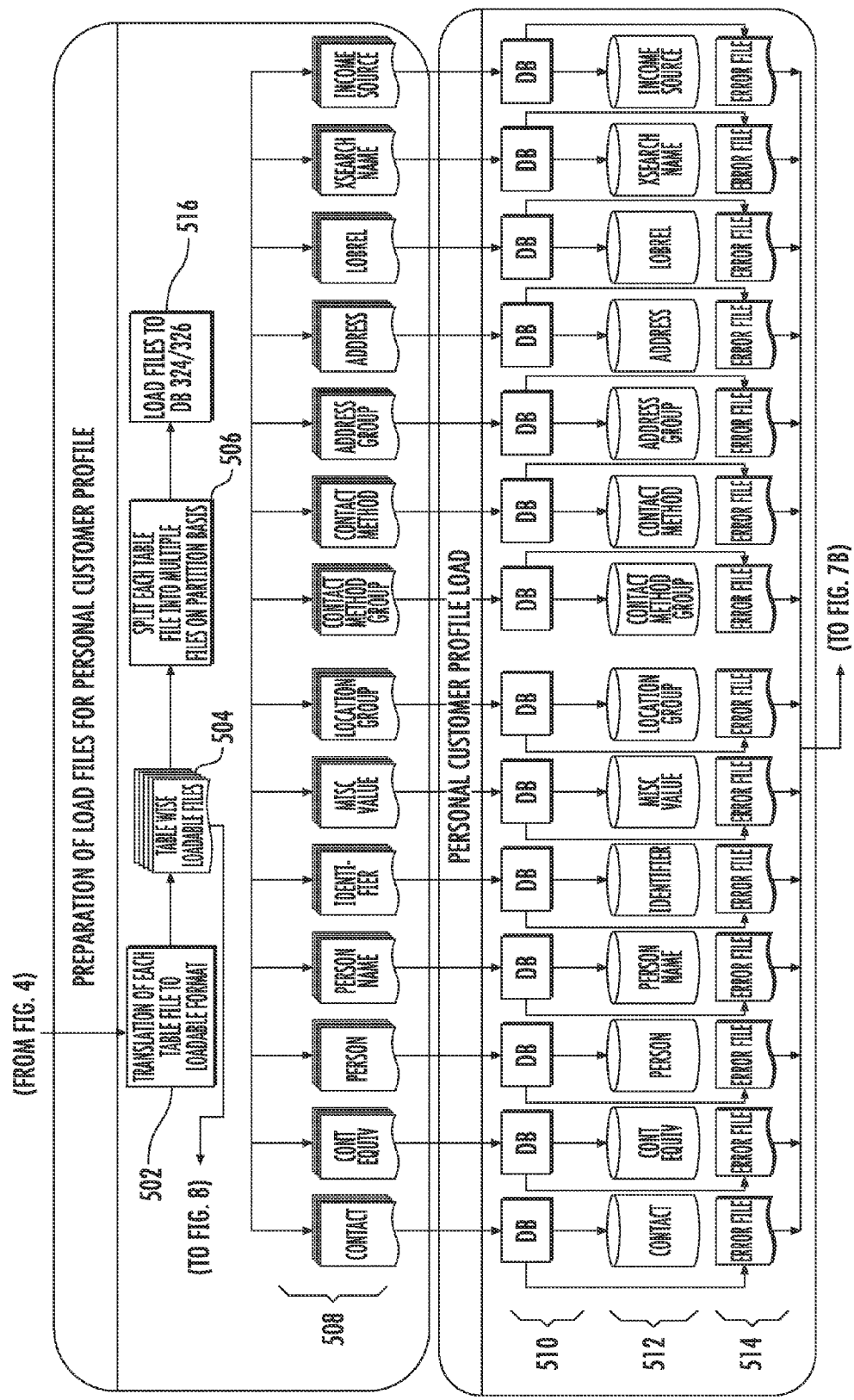
FIG. 5 depicts a flowchart describing a process for preparing and loading personal customer data files to an existing database, according to at least one embodiment of the present disclosure.
Figure 6:
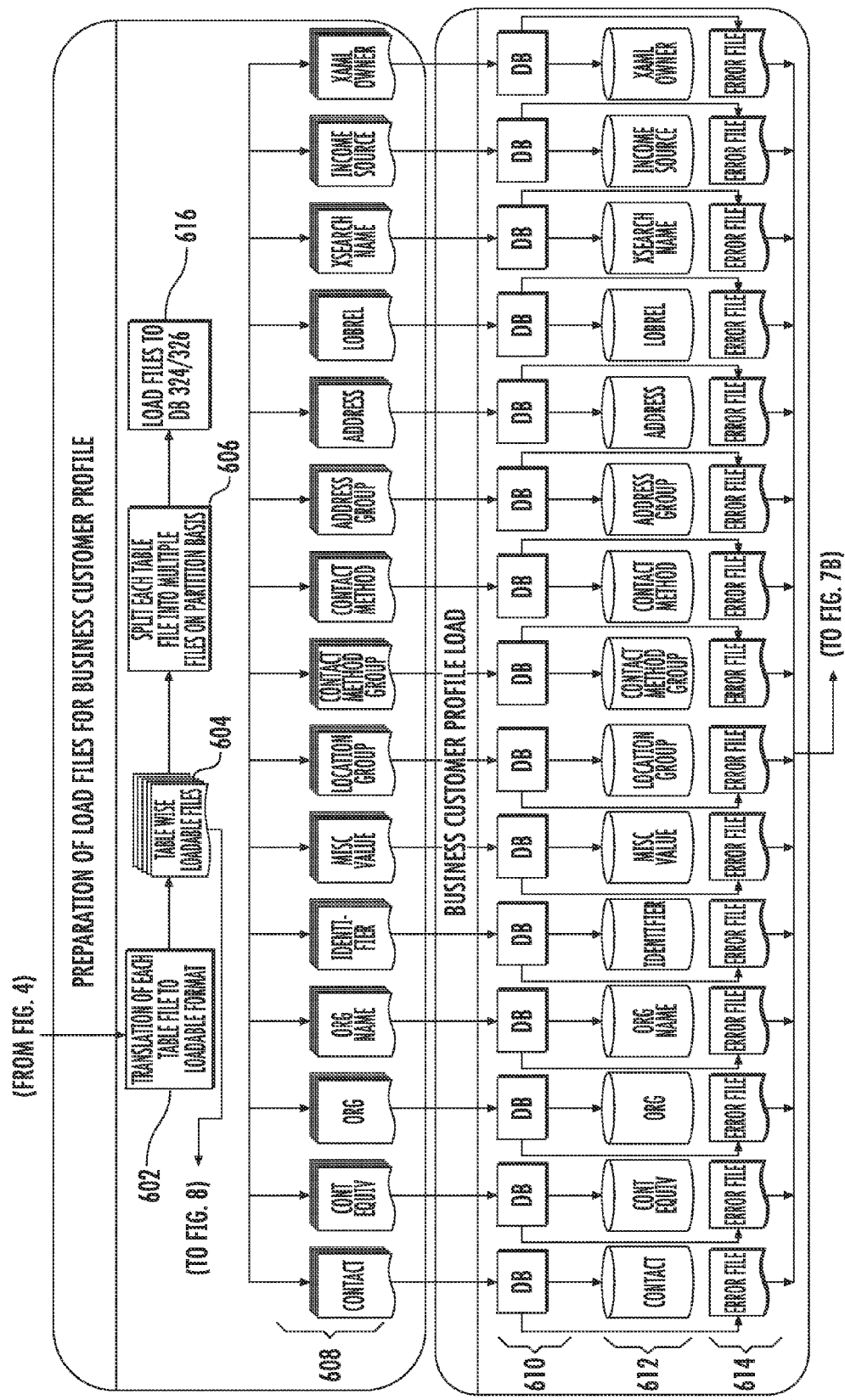
FIG. 6 is depicts a flowchart describing a process for preparing and loading business customer data files to an existing database, according to at least one embodiment of the present disclosure.

FIGS. 5 and 6 depict the process by which the load engine may prepare load files for personal customer data and business customer data, respectively, and further load the files to an existing database, according to at least one embodiment of the disclosure. Referring to both FIGS. 5 and 6, at 502, 602 the table files may be translated by the load engine into a loadable format to create table-wise loadable files at 504, 604. According to aspects of the disclosure, the loadable format may be based on a known programming language. Those skilled in the art will recognize that there are many suitable database programming languages suitable for implementing processes described herein, and that the invention should not be construed as limited to use with any particular programming language. For example, other platforms such as C++ and Java may also be used to implement aspects of the disclosure described herein.

After 504, 604, and prior to 506, 606, the load engine may identify data files in the load that were incorrectly or partially loaded and that must be backed out of the database load, i.e. deleted, and reloaded to the existing or target database. This process is described further below by reference to FIG. 8.

At 506, 606, the load engine may split the table-wise load files into separate partitions, such that the separate partitions may be loaded separately, but in parallel, for each table. The partition splitting may be based on the table key that is generated for the table. For example, the attribute tables may be partitioned such that the records starting with "A" in the key may go in the $1^{st}$ partition, the records starting with "B" through "C" in the key may go in the $2^{nd}$ partition, and the like. The partitions may also be based on a logical grouping provided by the underlying programming language. The tables may be split into any suitable number of partitions, and in many cases may be split into as many as 50 partitions.

As depicted in FIGS. 5 and 6, the partitioned files 508, 608 allow for the load engine to load multiple smaller partitions to the existing database(s) partitions 510, 610 to the respective database groups 512, 612. As would be readily understood by those skilled in the art, such partitioning and multithreaded file loading provides increased throughput. At 516, 616 the load engine has completed the load process for the table-wise files to the existing database. Also as depicted in FIGS. 5 and 6, any files that are improperly loaded or are not loadable are bumped as error files 514, 614 for reprocessing, as discussed below in relation to FIG. 7B.

Figure 7A:
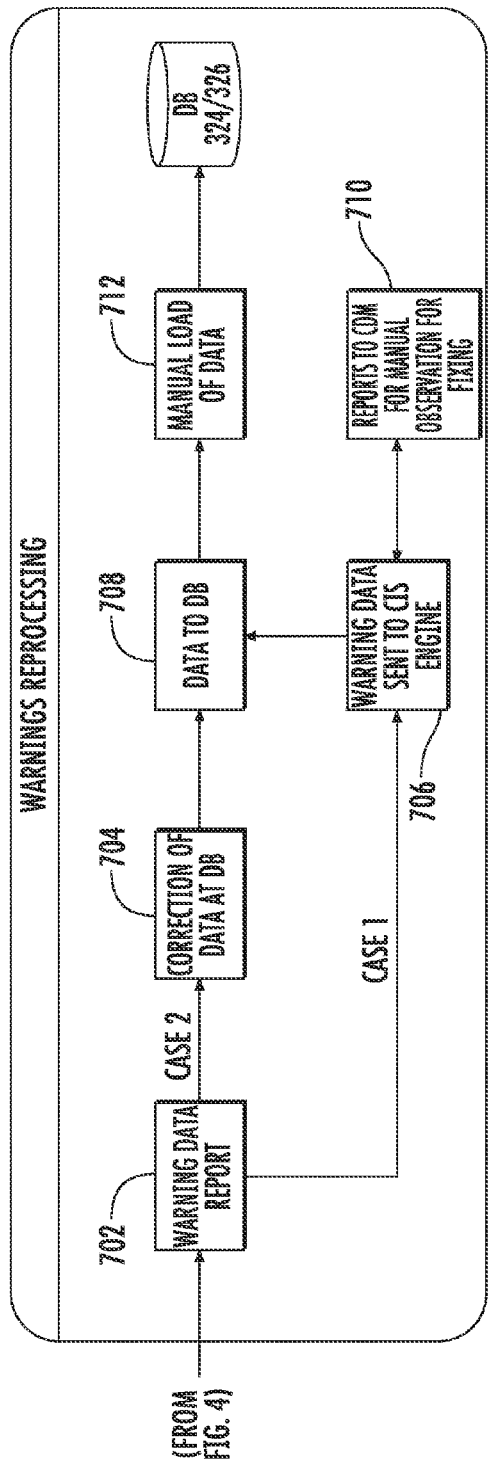
FIGS. 7A and 7B depict certain load process flows for exception files, according to at least one embodiment of the present disclosure.
Figure 7B:
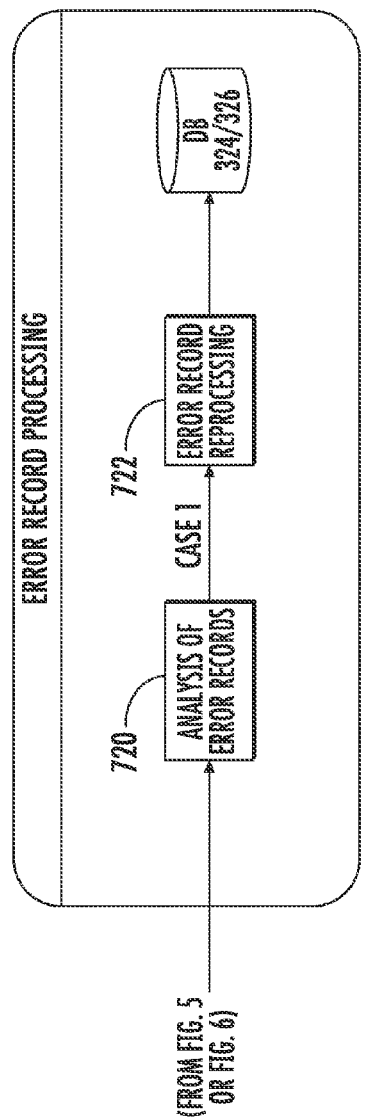

FIGS. 7A and 7B depict the load process flows for exception files, according to aspects of the disclosure described herein. Specifically, FIG. 7A depicts the processing of warning files 424, as the files are generated during the validations and transformations stage 410, depicted in FIG. 4. FIG. 7B depicts the processing of error files 514, 614, as the files are generated while loading the tablewise partitions, depicted in FIGS. 5 and 6.

Referring to FIG. 7A, warning files 424 may be captured during the transformation stage 410 (in reference to FIG. 4), and may be analyzed after an initial load (as depicted in FIGS. 5 and 6) takes place. According to aspects of the disclosure, warning files may be generated when customer records are incomplete or cannot be properly processed, for example, when a customer record is missing address information or an associated social security number. The load engine may prepare analysis report(s) 702 for each warning type, and may send the reports back to the CIS engine (at 706) for review and reloading according to the load process, or to a database management team (at 710) for a manual reload. For warning files that are unrecoverable or that cannot be fixed, the files may be manually discarded by a database management team. According to some embodiments, database services of the existing database may be utilized to correct the files at 704 for a further manual reload of the database at 708 and 712.

FIG. 7B depicts the flow for processing error files 514, 614 captured during the database load process, as depicted in FIGS. 5 and 6, respectively, and according to an embodiment of the disclosure. For example, an error file may be generated if a customer profile load is determined to be incomplete by the load engine, or if the load engine determines that the data integrity of a load file has been compromised. Any error files captured during the load process may be analyzed by the load engine at 720 after the initial load is completed to determine if the files can be fixed. If the load engine is able to correct the data files, the load engine may try to reload the files to the target database at 722. Error files that cannot be reloaded will be marked for purging (as described below in relation to FIG. 8).

Figure 8:
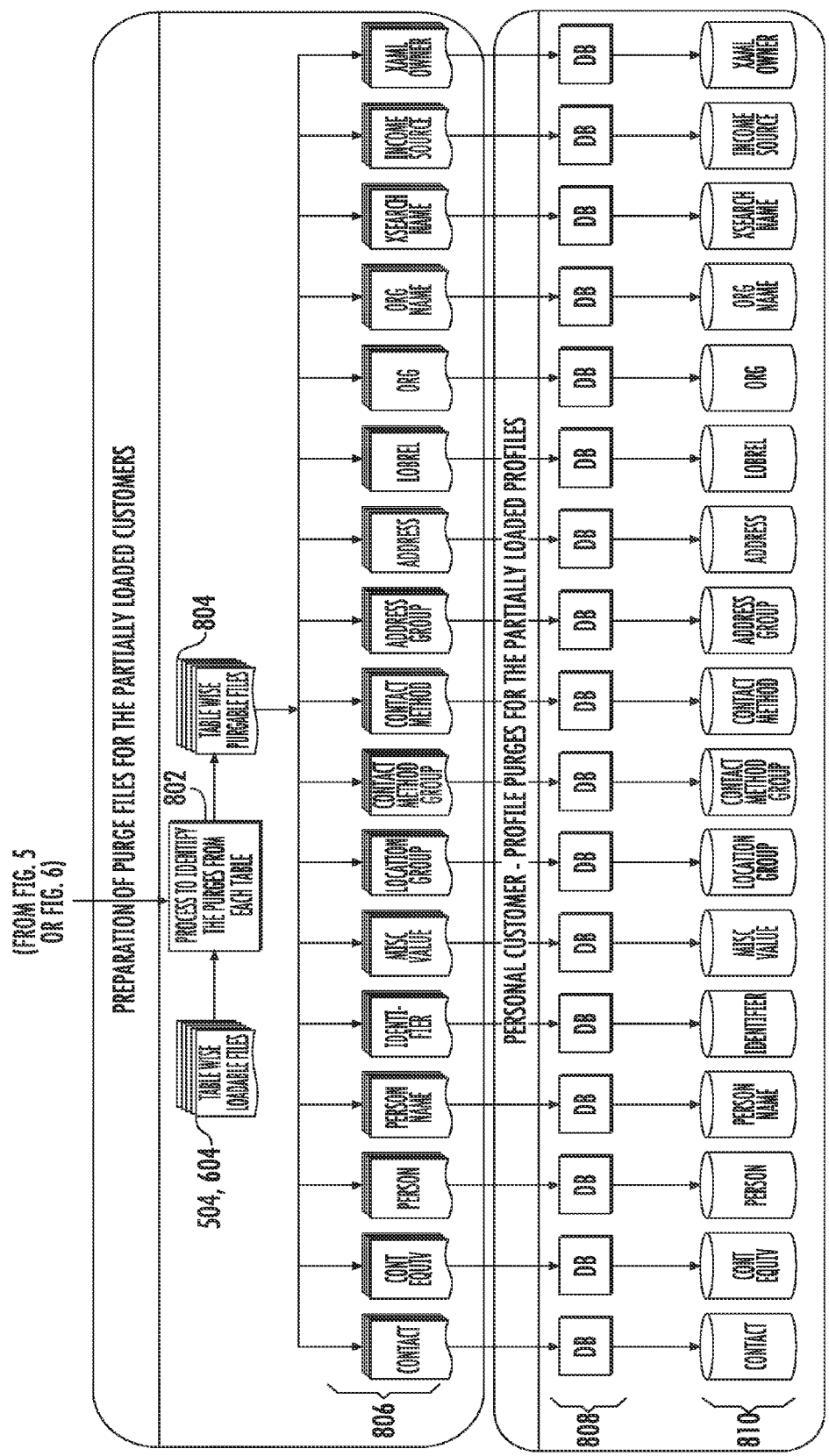
FIG. 8 depicts a flowchart describing process flows for purging files from an existing database, according to at least one embodiment of the present disclosure.

FIG. 8 depicts the process flows for purging new files from the existing database in the event of an error, according to embodiments described herein. In particular, the back-out process of FIG. 8 provides means for the load engine to reverse the load for the specific records that were loaded incorrectly. At 802, the load engine may determine which files should be purged from the existing tables 504, 604 (reference numbers carried over from FIGS. 5 and 6, respectively) based on table keys passed from the error files 514, 614. At 804, the load engine may create table-wise purge files, split into separate partitions. The load engine may partition the purge files in the same manner as the original load files, such that files to be purged may be easily removed from the database. As depicted in FIG. 8, partitioned purge files 806 may be removed from the existing database(s) partitions 808 and the respective database groups 810, in a manner reverse to the load process described above.

In addition, according to aspects of the disclosure, the load engine may also link customer data across existing and merged data, by associating a customer ID. For example, a database may have existing tables for a particular customer; if new data is acquired, such as when a business or entity acquires or is merged with another entity, the existing tables for existing customers may be updated by the load engine to reference a specific customer ID.

Figure 9:
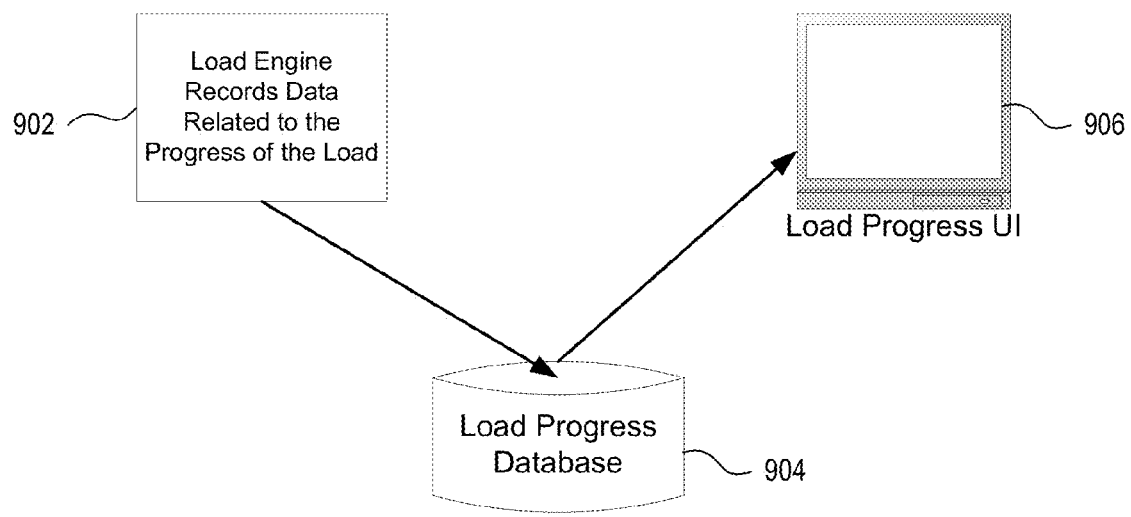
FIG. 9 depicts a process for tracking the progress of a data load, according to at least one embodiment of the present disclosure.

According to aspects of the disclosure, the load engine may also gather data regarding the progress of a specific data load, to facilitate creation of one or more user interfaces for tracking the progress of a specific data load. FIG. 9 depicts a process of tracking the progress of a specific data load, according to embodiments described herein. FIGS. 10-13 depict different views of an exemplary user interface (UI) suitable for tracking the progress of a data load according to embodiments described herein.

According to at least one example, the load engine may provide a mechanism to monitor and record the progress of a data load, by recording data related to the progress of the load in a metrics database or other storage medium, such as storage device 112 depicted in FIG. 1, and to further provide such data in the form of a UI depicting the progress of the load over time. The UI as described herein, and as depicted in FIGS. 10-13, may provide a visual indication of the progress of a specific data load at predetermined intervals throughout the data load, and may be implemented on any suitable computing device, such as server 108 or workstation 110, or other device deemed suitable by one of skill in the art.

FIG. 9 depicts a process for tracking the progress of a data load according to at least one embodiment described herein. According to FIG. 9, as the load engine is loading data to one or more operational data centers, at step 902 the load engine may also save progress data in a separate load progress database or metrics table 904. Thus, the load engine may register real-time statistics regarding how much of the current data load is complete and how much data remains to be loaded. By recording such data, at 906, a load progress UI may be generated.

In at least one embodiment, the load engine may record data regarding the total number of customer records to be loaded, the total number of tables to be loaded, characteristics of a particular load channel, such as the traffic level on the channel, and the like. Thus, as a data load progresses, the load engine may generate and save, in a load progress database or metrics table, data representing counts of records that have been loaded, counts of specific tables that have been loaded, counts of warning files and reject records, and the like. The load engine may record such progress at a recurring specified time interval during the load, such as every second, 30 seconds or minute.

Figure 10:
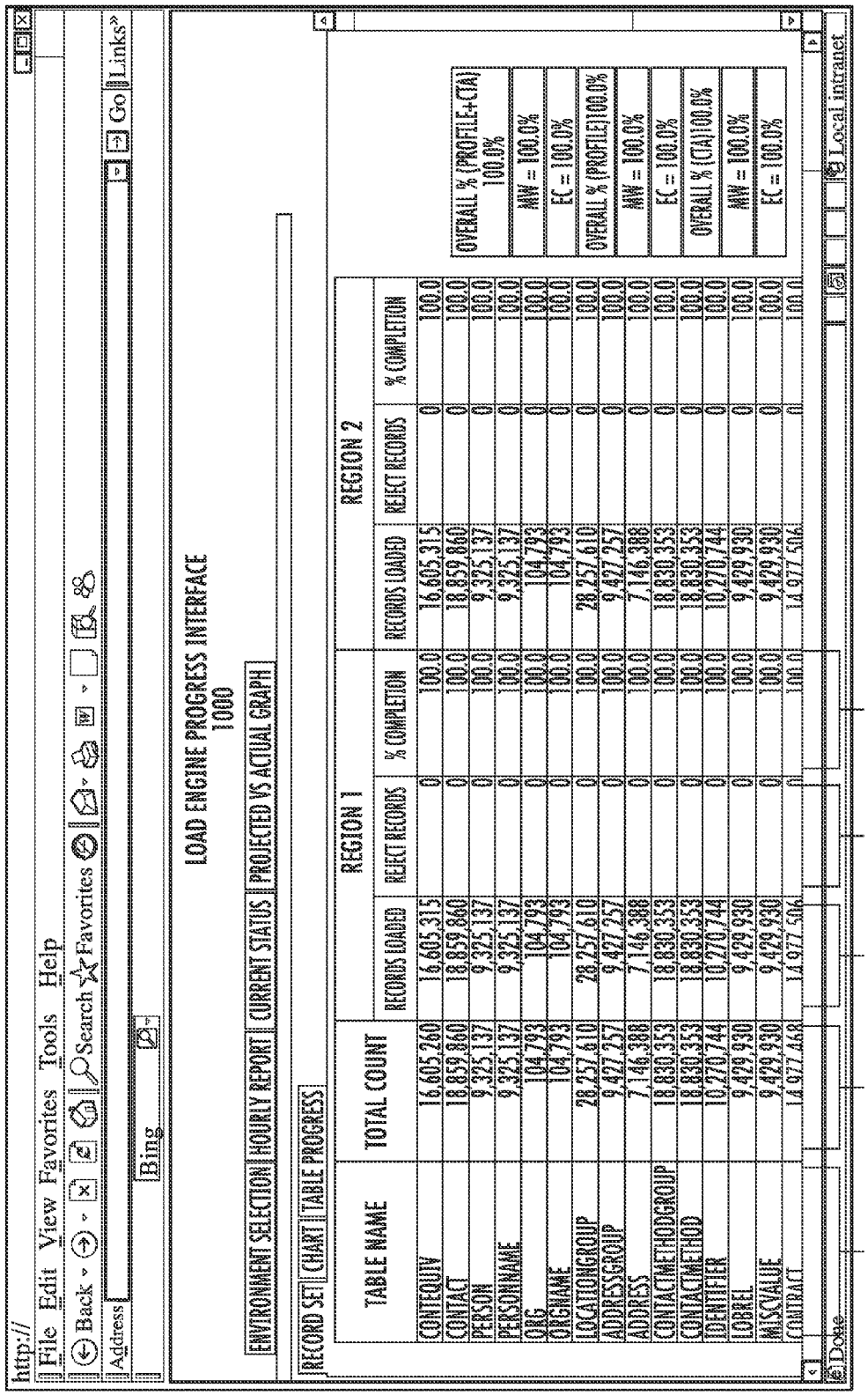
FIGS. 10-13 depict different views of an exemplary user interface suitable for tracking the progress of a data load according to embodiments of the load engine process described herein.

FIG. 10 depicts a load engine progress UI 1000 which details exemplary progress statistics for an exemplary data load in exemplary Regions 1 and 2. Exemplary Regions 1 and 2 may represent replicated or duplicate data centers, such as data centers 104 and 106 of FIG. 1. As shown in exemplary UI 1000 for exemplary Region 1, column 1002 displays a list of tables being loaded, column 1004 displays a total count of records to be loaded in each table during the exemplary data load, column 1006 displays the total number of records currently loaded for each table (i.e., the progress of the data load), column 1008 displays the number of reject records encountered during the load for each table, and column 1010 displays the percent completion for each table of the data load. The data for display in UI 1000 may be drawn from the data recorded by the load engine in the load progress database or metrics table 904 as described above.

Figure 11:
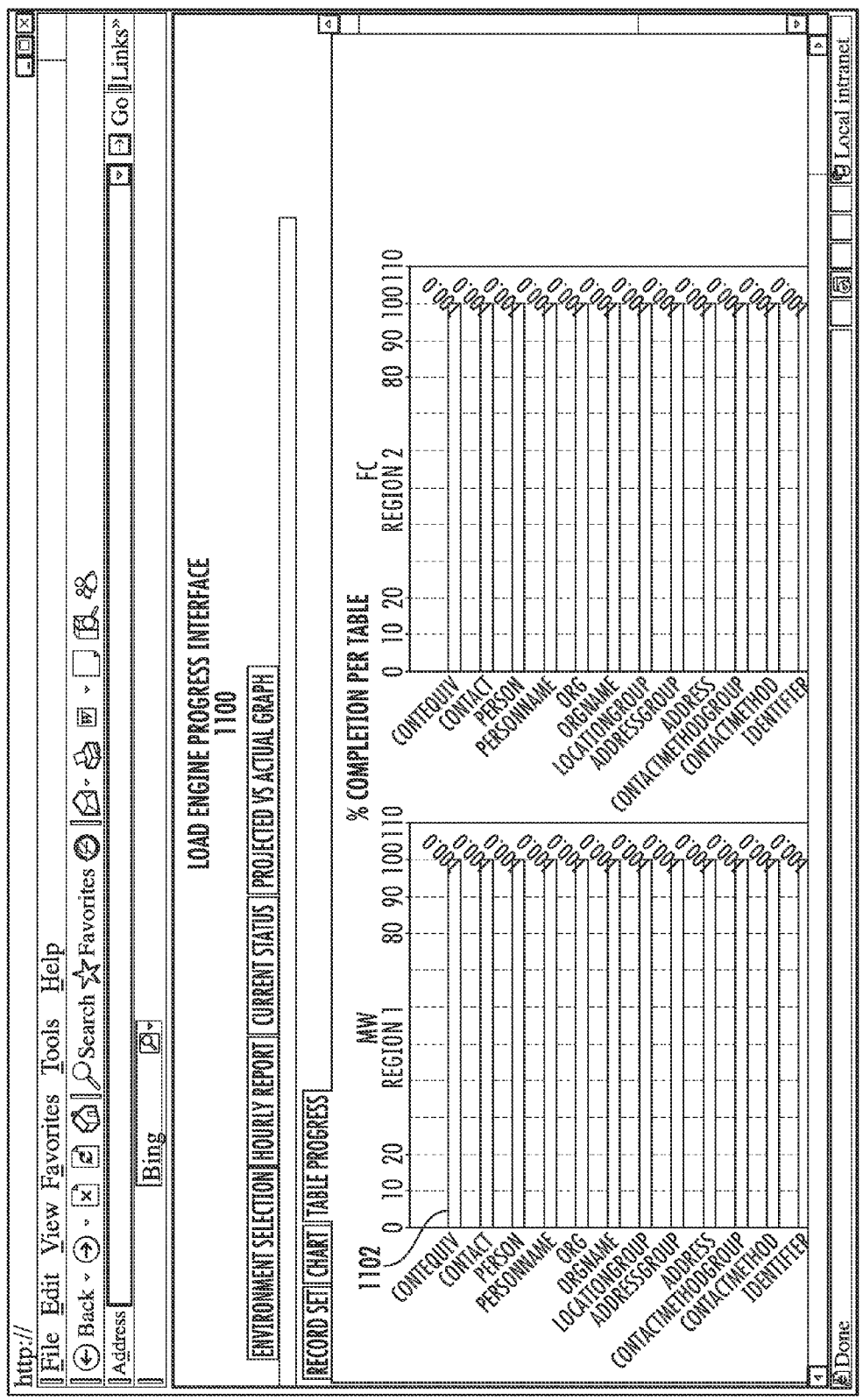

FIG. 11 depicts a load engine progress UI 1100 according to another embodiment described herein. In the load engine progress UI 1100 of FIG. 11, a data load progress indicator for the same exemplary Regions 1 and 2 (depicted in FIG. 10) are depicted in bar graph format, wherein each bar, such as bar 1102 for the "CONTEQUIV" table represent the percent completion of the exemplary data load.

The load progress mechanism, as described herein, may also provide load time forecasting. For example, the load engine may determine the total amount of time required for loading 19 tables containing data representing 3 million customer records, and thus may by able to determine and display on a load progress UI, a projected completion time for the load. Thus, as a data load progresses, the load engine progress mechanism, may be able to determine whether the load progress will allow for the projected completion time.

In addition, and in conjunction with the load engine progress mechanism and data stored in the load progress database or metrics table 904 as described herein, the load engine process may be able to adjust data load speeds based on different times of the day, and the dashboard mechanism may be able to adjust the completion time and update the load progress UI based on adjusted load speeds. For example, during peak business hours, when an operational customer database is being utilized by existing business operations, data load speeds may be slower. However, during the night, when business operations slow down, the load engine may increase load speeds of the new customer data. Thus, for example, it may be determined that for a first period of time, the load engine will load at a throughput of 100% capacity, and for a second period of time, during business hours, the load engine will load at a throughput of 50% capacity due to business demands on the system during business hours.

The load engine may also update the load progress database or metrics table on a recurring basis for a preset time interval (e.g., every second, every 30 seconds, and the like), as described above, while the load is taking place. Thus, the load engine may record data representing various factors with respect to the load, and prepare a real-time progress report with respect to a particular data load that is taking place. Such factors may include, for example, channel traffic, variability of load throughput, variability of recording intervals, number of tables, number of records within each table. From these factors, the load engine may depict a graph of the load engine progress next to a projected load completion, over time. For example, the dashboard may be able to determine that when 5% progress has been made with respect to an entire load, the progress is behind schedule with respect to the specified time and any previously projected load metrics. Thus, for example, where a projected load completion may have initially been 24 hours, a new projected load completion time may be determined to be 28 hours.

Figure 12:
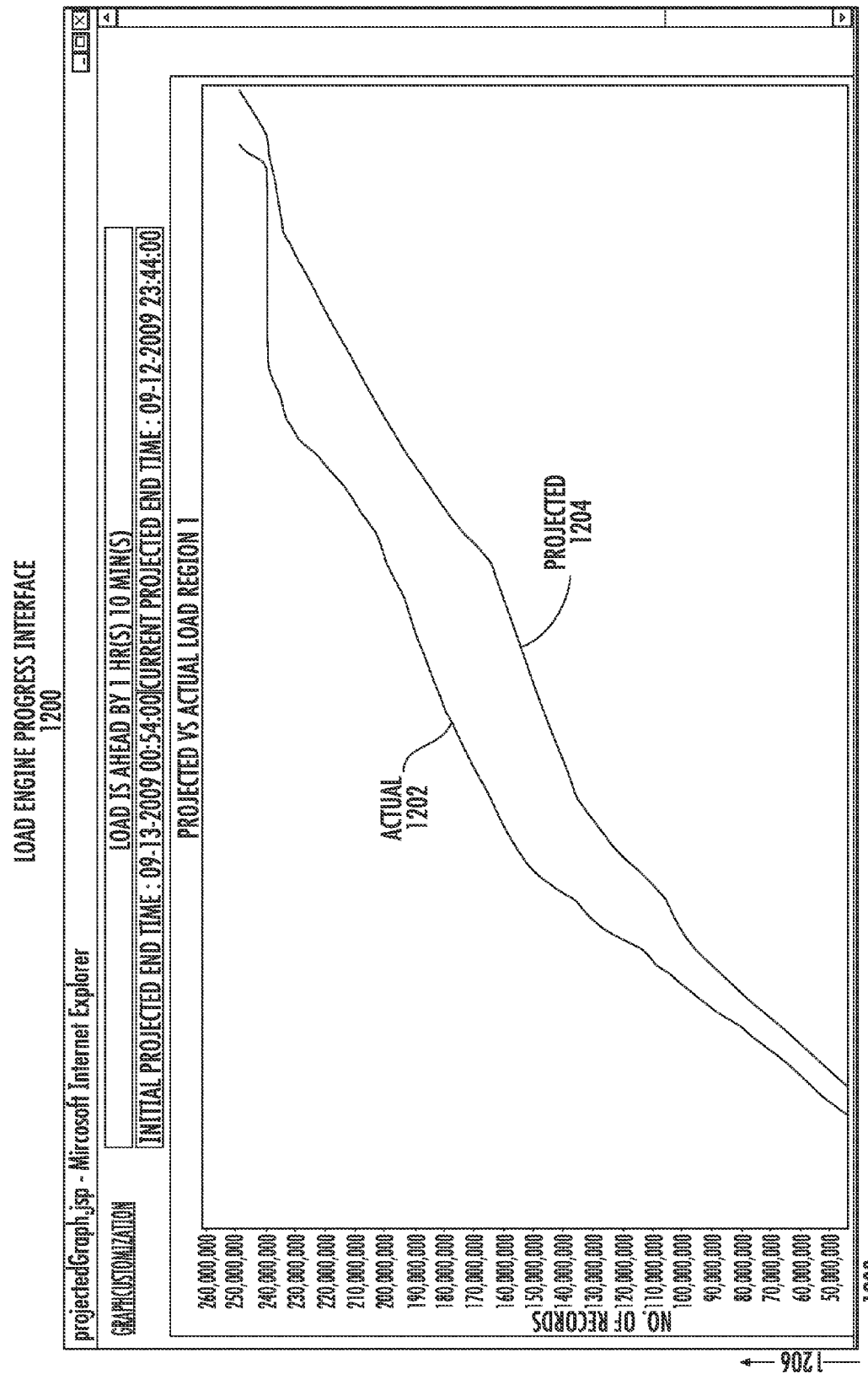
Figure 13:
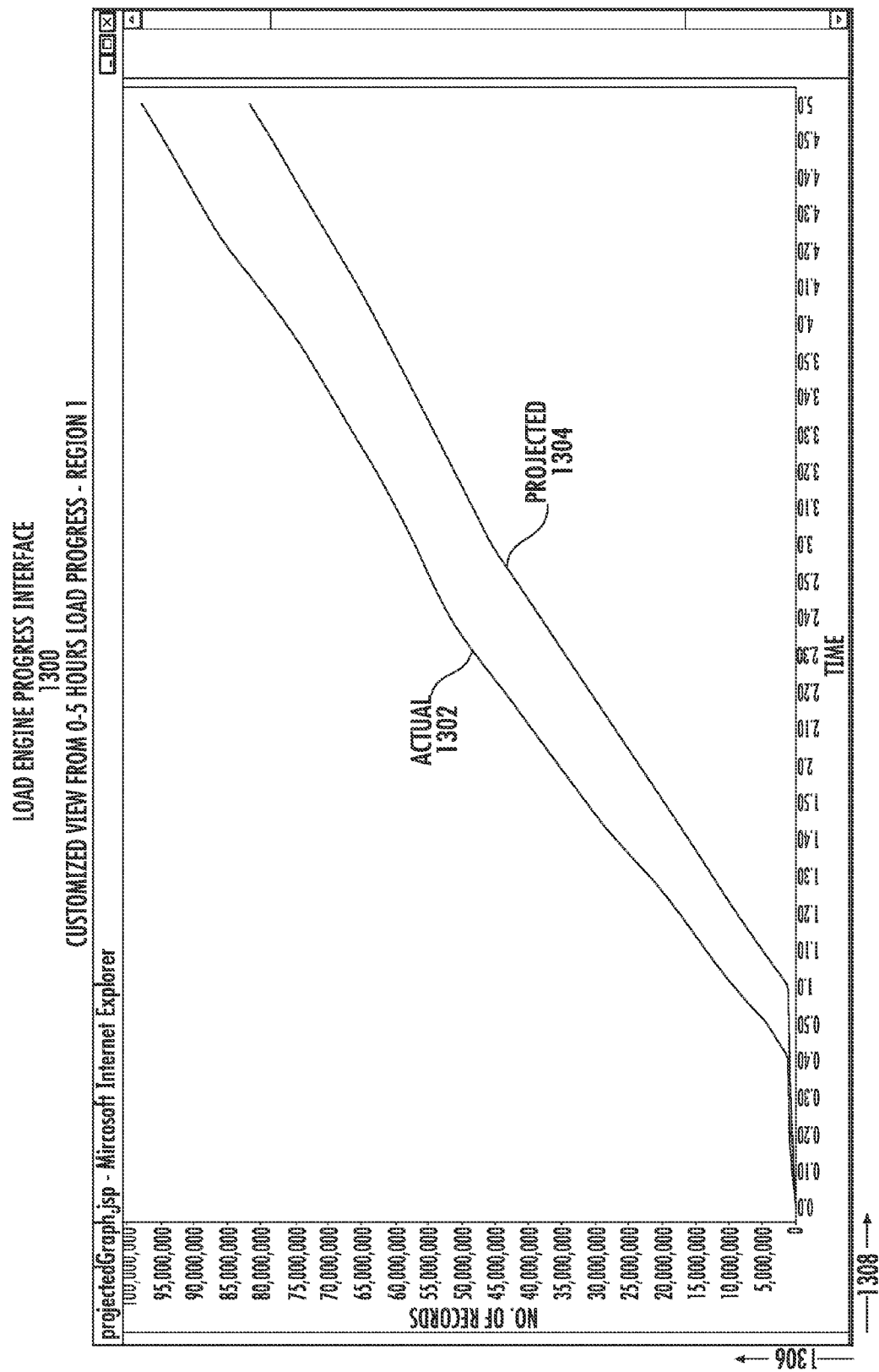

FIGS. 12 and 13 depict graphical views of an exemplary Load Engine Progress Interface 1200 and 1300, respectively. FIG. 12 depicts a graphical view of an actual load process progress over time, line 1202, next to a graphical view of a projected load process progress over time, line 1204, in exemplary Region 1. As seen in FIG. 12, the Y-axis 1206 corresponds to the number of records loaded and the X-axis 1208 corresponds to time. According to embodiments described herein, the graphical UI may also be customized. FIG. 13 depicts a graphical view of an exemplary customized view for the first 5 hours of a data load. Similar to the graph depicted in FIG. 12, the graph of FIG. 13 shows an actual load process progress over a period of 5 hours, line 1302, next to a projected load process progress over time, line 1304, in exemplary Region 1.

Aspects of the load engine progress UI, such as depicted in the examples of FIGS. 10-13 may be implemented using any standard graphical user interface (GUI) tool known to those skilled in the art, such as a standard JAVA GUI tool. As described herein, the standard GUI may be configured to receive data from the statistics table generated by the load engine during the load process. However, it should be noted that any suitable mechanism for generating the disclosed UIs can be used, and such mechanisms will be readily available to those skilled in the art.

It should be noted that certain aspects of the present disclosure have been described herein, but the invention is not limited to the embodiments described. Those skilled in the art will recognize variations embodied by the present disclosure upon reading or upon practice of the invention. The following claims demonstrate the breadth of the invention.

We claim:

1. A method for loading customer data to a target customer database, comprising:
    receiving, at a processor, a plurality of data records, wherein each data record contains attribute data for at least one customer;
    validating, by the processor, the plurality of data records;
    determining, by the processor, that at least one data record lacks attribute data comprising a mandatory attribute data type;
    generating, by the processor, a separate warning file comprised of the at least one data record lacking the mandatory attribute data type;
    transforming, by the processor, the attribute data for the at least one customer to a format compatible with attribute data in the target customer database;
    checking the transformed data for customer addresses that match an address in the target customer database;
    grouping into separate files, by the processor, the transformed attribute data by an attribute data type;
    generating, by the processor, a key to be associated with the attribute data type for each separate file;
    generating, by the processor, loadable files based on the separate files and the key, for loading to the target database;
    partitioning, by the processor, the loadable files into a plurality of partitioned files based on the attribute type;
    transferring the plurality of partitioned files to the target database; and
    identifying any files that were partially loaded to the target database, deleting the partially loaded files from the target database by splitting the partially loaded files into separate partitions, and reloading any files that were partially loaded to the target database.

2. The method of claim 1, wherein the mandatory attribute data type is a name.

3. The method of claim 1, further comprising:
    determining, by the processor, whether the mandatory attribute data type can be added to the data records contained in the separate warning file.

4. The method of claim 1, wherein the step of transforming further comprises:
    determining, by the processor, that a set of attribute data should be replaced with an attribute specific code provided by the target database; and
    replacing, by the processor, the set of attribute data with the attribute-specific code provided by the target database.

5. The method of claim 1, wherein the customer data is personal customer data.

6. The method of claim 1 wherein the customer data is business customer data.

7. The method of claim 1 wherein the attribute data is selected from a group consisting of: personal name, organization name, address, and contact method.

8. A method for loading data to a target database, comprising:
    receiving, at a load engine, a plurality of data records, wherein each data record contains attribute data;
    validating, by the load engine, the plurality of data records;
    determining, by the load engine, that at least one data record lacks attribute data comprising a mandatory attribute type;
    generating, by the load engine, a warning file comprised of the at least one data record lacking attribute data comprising a mandatory attribute type;
    determining, by the load engine, whether the attribute data is compatible with a data format of the target database;
    checking, by the load engine, the attribute data for customer addresses that match an address in the target database;
    generating, by the load engine, separate tables comprising a set of attribute data by an attribute type;
    generating, by the load engine, a plurality of keys to be associated with the attribute type for each separate table;
    generating, by the load engine, separate loadable files for each separate table and associated key;
    partitioning, by the load engine, each separate loadable file into a plurality of partitioned files;
    transferring the plurality of partitioned files to the target database; and
    identifying any files that were partially loaded to the target database, deleting the partially loaded files from the target database by splitting the partially loaded files into separate partitions, and reloading any files that were partially loaded to the target database.

9. The method of claim 8, wherein the mandatory attribute type is a name.

10. The method of claim 8, further comprising:
    transforming, by the load engine, a subset of the attribute data that is not compatible with the data format of the target database to a format that is compatible with the data format of the target database.

11. The method of claim 8, wherein the plurality of data records comprise customer data.

12. The method of claim 11, wherein the customer data is personal customer data.

13. The method of claim 11, wherein the customer data is business customer data.

14. The method of claim 8, further comprising:
determining, by the load engine, that a set of attribute data should be replaced with an attribute-specific code provided by the target database; and
replacing, by the load engine, the set of attribute data with the attribute-specific code provided by the target database.

15. A non-transitory computer-readable medium comprising computer-executable instructions that when executed cause a computer device to perform the steps comprising:
receiving a plurality of data records, wherein each data record contains attribute data;
validating the plurality of data records;
determining that at least one data record lacks attribute data comprising a mandatory attribute type;
generating a warning file comprised of the at least one data record lacking attribute data comprising a mandatory attribute type;
determining whether the attribute data is compatible with a data format of the target database;
checking the attribute data for customer addresses that match an address in the target database;
generating separate tables comprising a set of attribute data by an attribute type;
generating a plurality of keys to be associated with the attribute type for each separate table;
generating separate loadable files for each separate table and associated key;
partitioning each separate loadable file into a plurality of partitioned files;
transferring the plurality of partitioned files to the target database; and
identifying any files that were partially loaded to the target database, deleting the partially loaded files from the target database by splitting the partially loaded files into separate partitions, and reloading any files that were partially loaded to the target database.

16. The non-transitory computer-readable medium of claim 15, wherein the mandatory attribute type is a name.

17. The non-transitory computer readable medium of claim 15, further comprising:
transforming a subset of the attribute data that is not compatible with the data format of the target database to a format that is compatible with the data format of the target database.

* * * * *